United States Patent
Karl

(10) Patent No.: US 8,428,903 B2
(45) Date of Patent: Apr. 23, 2013

(54) METHOD AND DEVICE FOR DETERMINING A SPEED OF AN OBJECT

(75) Inventor: Matthias Karl, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 664 days.

(21) Appl. No.: 12/496,856

(22) Filed: Jul. 2, 2009

(65) Prior Publication Data
US 2010/0030511 A1  Feb. 4, 2010

(30) Foreign Application Priority Data
Jul. 8, 2008 (DE) .......................... 10 2008 040 248

(51) Int. Cl.
*G01S 15/58* (2006.01)
(52) U.S. Cl.
USPC ......................................................... 702/143
(58) Field of Classification Search ............. 702/57, 702/64, 69, 74, 76, 78, 79, 142, 143, 189, 702/190; 380/268; 375/321
See application file for complete search history.

(56) References Cited

U.S. PATENT DOCUMENTS

| | | | |
|---|---|---|---|
| 3,940,731 A | 2/1976 | Cooper et al. | |
| 3,953,823 A | 4/1976 | Katakura | |
| 5,724,041 A * | 3/1998 | Inoue et al. | 342/70 |
| 6,072,423 A | 6/2000 | Doisy et al. | |
| 2004/0264297 A1 * | 12/2004 | Berkman et al. | 367/99 |
| 2007/0258593 A1 * | 11/2007 | Hepler | 380/268 |

FOREIGN PATENT DOCUMENTS

| | | |
|---|---|---|
| DE | 198 02 724 | 7/1999 |
| EP | 0 896 176 | 2/1999 |
| GB | 1 209 025 | 10/1970 |
| WO | WO 97/42520 | 11/1997 |

\* cited by examiner

*Primary Examiner* — Mohamed Charioui
(74) *Attorney, Agent, or Firm* — Kenyon & Kenyon LLP

(57) ABSTRACT

A device for determining a speed of an object, having a receiver for receiving a pulse, having a characteristic signal sequence, which is emitted or reflected from an object; a signal processing device for providing transformed signal sequences for various speeds, the signal sequences being determined from the characteristic signal sequence by transforming the time axis of the signal sequence according to a Doppler shift for the speed; and a data processing device for determining the speed of the object based on a correlation of the received pulse with the transformed signal sequences.

8 Claims, 3 Drawing Sheets

METHOD AND DEVICE FOR DETERMINING A SPEED OF AN OBJECT

BACKGROUND INFORMATION

A problem upon which the present invention is based is explained as an example, with reference to an ultrasonic detection system for vehicle surroundings.

German Patent Application No. DE 198 02 724 describes a transmitter which emits a modulated carrier signal having a characteristic signal shape. The signal is reflected from an object. A receiver detects the reception of the reflected signal and determines the time period between transmission and reception. The distance from the object is determined taking the speed of sound into account.

Updating of the distance is limited by necessary transmission pauses between the signals. The transmission pauses are typically 30 ms long. The position of the object during the transmission pause may be determined by extrapolating the motion of the object. However, this results in considerable inaccuracy in determining the speed, in particular due to the fact that an association of reflecting points with echoes may be incorrect.

SUMMARY OF THE INVENTION

The present invention relates to a method for determining a speed, having the following steps:

receiving a pulse having a characteristic signal sequence, which is emitted or reflected from an object;

providing transformed signal sequences for various speeds, the signal sequences being determined from the characteristic signal sequence by transforming the time axis of the signal sequence according to a Doppler shift for the speed; and determining the speed of the object based on a correlation of the received pulse with the transformed signal sequences.

A further aspect of the present invention relates to a device for determining a speed of an object, including:

a receiver for receiving a pulse having a characteristic signal sequence, which is emitted or reflected from an object;

a signal processing device for providing transformed signal sequences for various speeds, the signal sequences being determined from the characteristic signal sequence by transforming the time axis of the signal sequence according to a Doppler shift for the speed; and a data processing device for determining the speed of the object based on a correlation of the received pulse with the transformed signal sequences.

The speed is determined directly from the signal sequences. This requires no assumptions concerning the surroundings, the number and position of the objects etc., which could reduce the reliability of the determination.

DETAILED DESCRIPTION

Figure 1:
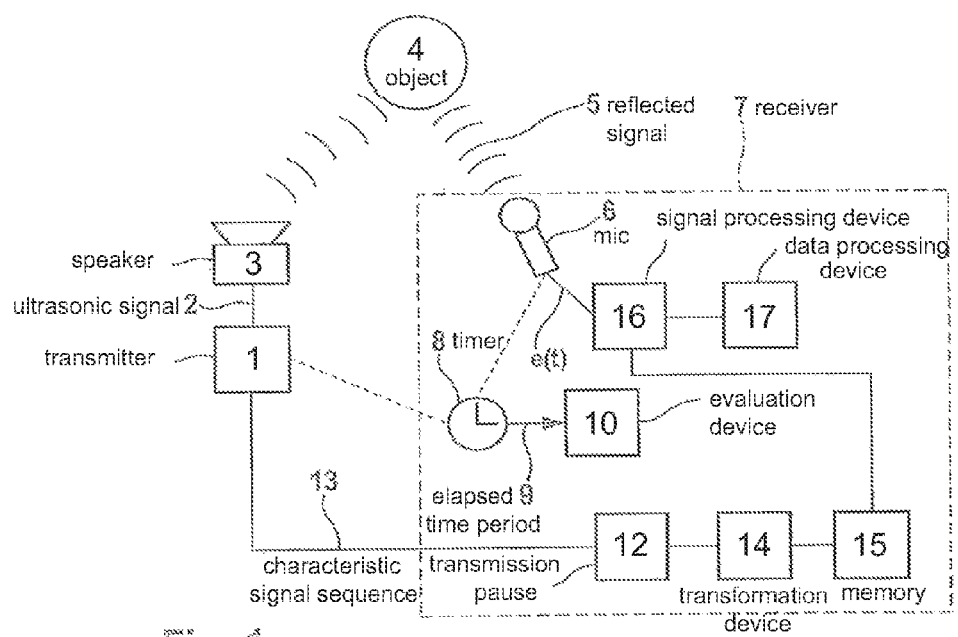
FIG. 1 shows one specific embodiment of a device for determining a distance from an object.

FIG. 1 shows a first embodiment of a device for determining the speed. A transmitter 1 generates an ultrasonic signal 2. Ultrasonic signal 2 is output by a speaker 3. Ultrasonic signal 2 may be reflected from an object 4. Reflected signal 5, also referred to as an echo, is received by a microphone 6 of a receiver 7.

Transmitter 1 starts a timer 8 when the transmitter emits ultrasonic signal 2. Receiver 7 stops timer 8 when the receiver receives an echo, or causes timer 8 to output the elapsed time period 9. From the time period and the speed of sound, an evaluation device 10 determines the distance from reflecting object 4.

Figure 2:
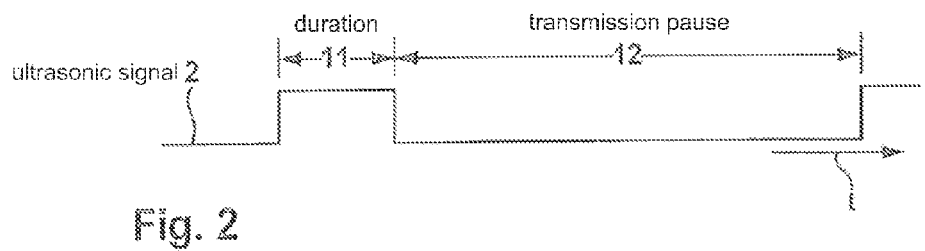
FIG. 2 shows an ultrasonic pulse sequence.

Ultrasonic signal 2 has a pulse shape having a fixed duration 11 (FIG. 2). After ultrasonic signal 2 is emitted, a transmission pause 12 occurs. Transmission pause 12 may be much longer, more than five times longer, than duration 11 of ultrasonic signal 2.

Duration 11 of ultrasonic signal 2 is dimensioned in such a way that a sufficiently strong pulse is emitted. The pulse is sufficiently strong when its echo from all objects within a radius of detection is still above a detection threshold of receiver 7.

Transmission pause 12 may be dimensioned in such a way that even an echo from an object at the edge of the radius of detection still arrives at receiver 7 within transmission pause 12. This ensures that an echo of a near object does not overlap with an echo of a distant object from two successively emitted pulses.

As an alternative to a long transmission pause 12, ultrasonic signals 2 may be coded using various signal sequences. The successively emitted ultrasonic signals 2 are coded using various signal sequences during the time period within which the echoes arrive from the most distant objects to be detected, i.e., the transmission pause 12 described above.

The signal sequences may be impressed on the ultrasonic pulse using a code multiplexing method. Characteristic pulse sequence 13 may include stochastic coding, orthogonal code words, etc.

To avoid sonic flooding, it has proven to be practical to insert transmission pauses also when signal sequences are used. Sonic flooding occurs in particular when an echo is able to arrive at the receiver via various paths, for example due to multiple reflections. Another reason for sonic flooding may be multiple spatially offset, strongly reflecting surfaces. The selectivity of the filters for distinguishing between the individual code words may then decrease significantly. The transmission pauses lower the average sound density and increase the selectivity.

The update rate for the distance from the object is specified by the necessary transmission pauses 12. The distance may be determined during transmission pause 12 by using the specified distance and a given speed of the object. An appropriate data processing device determines the instantaneous distance of the object based on a given speed of the object and its last known distance.

The manner in which the speed of the object is determined from the received echoes is described below.

A characteristic signal sequence 13 is impressed on ultrasonic signal 2. This may be performed using a code multiplexing method, for example. Pseudorandom sequences are suitable as impressed code words. Other code words are selected from a group of mutually orthogonal code words, for example, a Walsh code.

The characteristic signal sequence 13 used may be stored in a memory 12, or may be provided to receiver 7 in some other way.

The relative speed between the reflecting object and the receiver is unambiguously impressed on the received signal sequence. If the object moves away from the receiver, the received signal sequence is expanded over time relative to the originally emitted signal sequence. Conversely, the received signal sequence is compressed over time relative to the originally emitted signal sequence when the object moves toward the receiver. This effect is referred to as the Doppler effect or Doppler shift, and occurs for sound waves as well as electromagnetic waves.

The embodiment takes into account the expansion and compression of the characteristic signal sequence in order to determine therefrom the speed of the object.

A transformation device 14 applies the principle of the Doppler shift for various speeds to characteristic signal sequence 13. The resulting transformed signal sequences c1, c2, c3 are provided to receiver 7 together with the associated speeds, for example in a memory 15.

During operation of the receiver, transformed signal sequences c1, c2, c3 may be dynamically determined for the characteristic signal sequences in use at the time, or computed in advance and stored in a memory 15.

Figure 3:
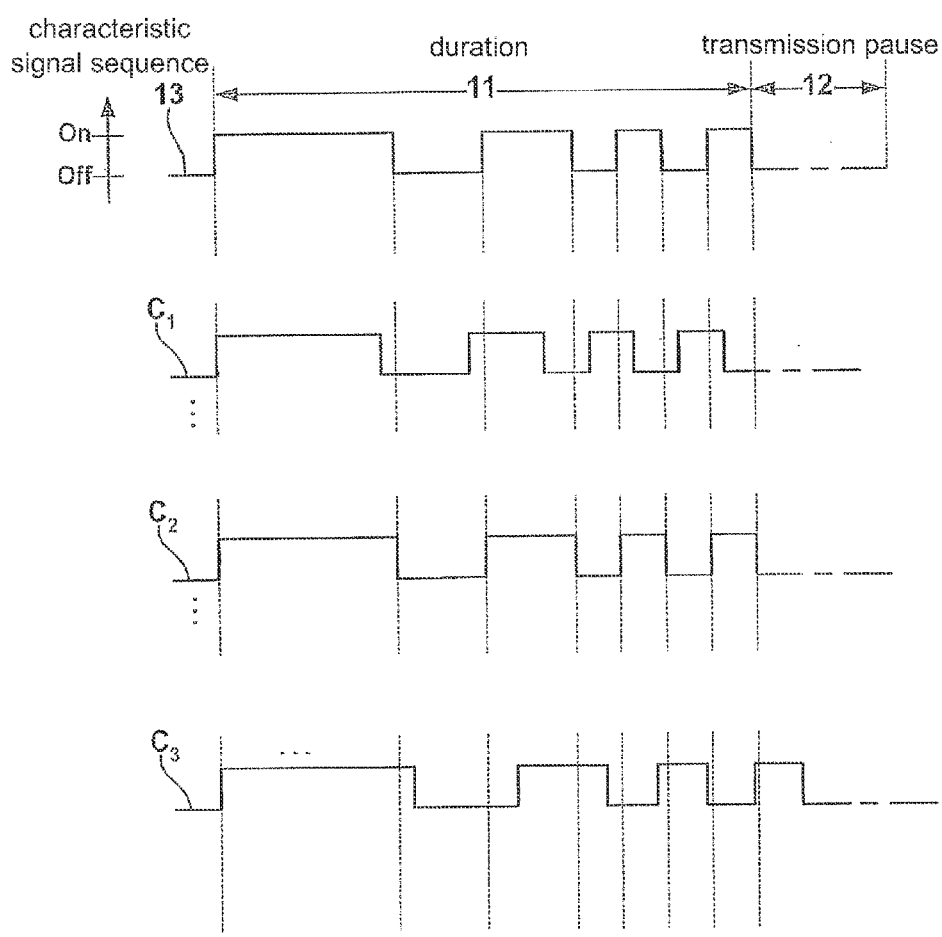
FIG. 3 shows examples of transformed signal sequences.

FIG. 3 illustrates an example of a characteristic signal sequence 13. A first transformed signal sequence c1 is determined for a first (relative) speed of an object which moves toward the receiver. A second transformed signal sequence c2 is determined for an object which remains at a constant distance from the receiver. A third transformed signal sequence c3 is determined for an object which moves away from the receiver at a second (relative) speed.

A signal processing device 16 is provided in the receiver. The signal processing device determines the correlation of received echo e(t) with the provided transformed signal sequences c1, c2, c3.

Figure 4:
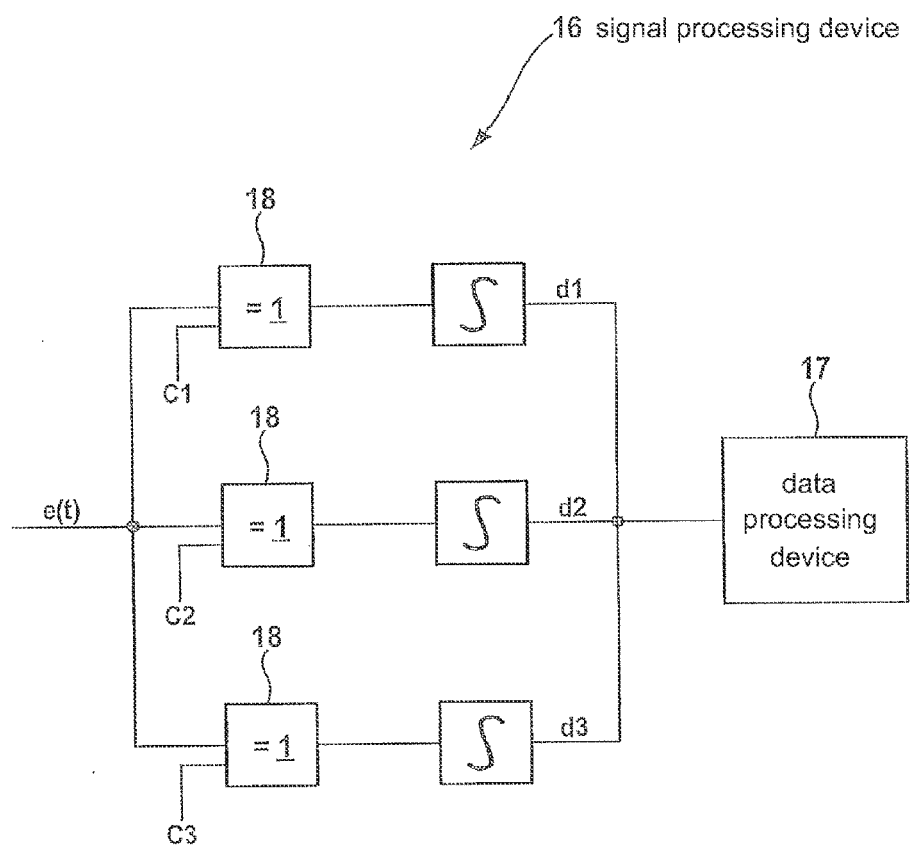
FIG. 4 shows a signal processing device for the specific embodiment from FIG. 1.

FIG. 4 shows the principle of operation of signal processing device 16 for a convolution code, with reference to a block diagram. Received echo e(t) is summed to first transformed signal sequence c1 in a binary adder and is integrated over the length of the convolution code. The resulting analog value d1 is a measure of the agreement (correlation value) of received echo e(t) and first transformed signal sequence c1. Received echo e(t) is likewise correlated with the other transformed signal sequences to determine their correlation values d2, d3.

A data processing device 17 determines a next arriving signal sequence from the transformed signal sequences c1, c2, c3 as the signal sequence having the highest correlation value d1, d2, d3 with received echo e(t). The speed associated with the next arriving signal sequence is output as the speed of the object, and exceeds the correlation values which may be used to stop timer 8.

In another embodiment, an average value is formed from the two speeds whose signal sequences have the two highest correlation values. The average value is output as the speed of the object.

In another embodiment, a weighted average value of all speeds is determined. The weighting for each speed is a function of the correlation value of the associated transformed signal sequence and the received echo.

The number of provided transformed signal sequences may be fixed as a function of the desired resolution of the speed. In addition, the speeds and associated transformed signal sequences may be determined or selected on the basis of the expected speeds. The expected speeds may be determined by taking into account the absolute speed of the receiver, i.e., the speed of the motor vehicle.

If an invariable characteristic signal sequence is used, the corresponding transformed signal sequences may be stored in a suitable memory device.

The preceding specific embodiments use ultrasound as the carrier wave. Other embodiments may use radar waves in the GHz range, infrared light, or visible light. The transmitters and receivers must be correspondingly adapted. Code words or other characteristic signal sequences and their transforms are used as described for the preceding specific embodiments.

What is claimed is:

1. A method for determining a speed of an object, comprising:
   receiving, by a receiver, a pulse having a characteristic signal sequence, which is emitted or reflected from an object;
   providing, by a signal processing device, transformed signal sequences for various speeds, the signal sequences being determined from the characteristic signal sequence by transforming a time axis of the signal sequence according to a Doppler shift for the speed;
   determining, by a data processing device, a correlation of the received pulse with the transformed signal sequences; and
   determining, by the data processing device, the speed of the object based on the determined correlation.

2. The method according to claim 1, wherein the speed of the object is determined as the speed whose associated transformed signal sequence has a highest correlation with the received pulse.

3. The method according to claim 1, wherein the speed of the object is determined on the basis of a weighting of the correlation of the transformed signal sequences with the received pulse.

4. The method according to claim 1, wherein two successive pulses are separated by a pause which is at least five times a duration of the pulse.

5. The method according to claim 1, wherein a code word is impressed on the characteristic signal sequence, using a code multiplex method.

6. The method according to claim 5, wherein the code word is generated by a pseudorandom number.

7. The method according to claim 5, wherein the code word is selected from an orthogonal set of code words.

8. A device for determining a speed of an object, comprising:
   a receiver for receiving a pulse having a characteristic signal sequence, which is emitted or reflected from an object;
   a signal processing device for providing transformed signal sequences for various speeds, the signal sequences being determined from the characteristic signal sequence by transforming a time axis of the signal sequence according to a Doppler shift for the speed; and
   a data processing device for determining a correlation of the received pulse with the transformed signal sequences and determining the speed of the object based on the correlation.

* * * * *